(12) United States Patent
Nagata et al.

(10) Patent No.: US 6,947,092 B1
(45) Date of Patent: Sep. 20, 2005

(54) OPTICAL DEVICE

(75) Inventors: Katsuhiko Nagata, Urawa (JP);
Yasuichi Ishii, Yokohama (JP); Takashi Kamai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/281,164

(22) Filed: Mar. 30, 1999

(30) Foreign Application Priority Data

Apr. 3, 1998 (JP) .................................. 10-091444
Mar. 15, 1999 (JP) .................................. 11-068513

(51) Int. Cl.[7] ...................... H04N 5/225; H04N 5/232; H04N 5/235; G03B 17/00
(52) U.S. Cl. ...................... 348/360; 348/373; 348/345; 348/362; 396/542
(58) Field of Search ................. 348/335, 208, 348/231.7, 373–376, 207.99, 360–366, 345; 396/71, 72, 532, 530, 542

(56) References Cited

U.S. PATENT DOCUMENTS

| | | | | |
|---|---|---|---|---|
| 4,472,740 A | | 9/1984 | Doi ............................ 358/209 |
| 4,724,453 A | | 2/1988 | Hamano ................. 354/289.12 |
| 4,935,760 A | * | 6/1990 | Kojima ......................... 396/71 |
| 4,959,728 A | | 9/1990 | Takahashi et al. .......... 358/228 |
| 5,003,399 A | * | 3/1991 | Ishimaru et al. ............ 396/529 |
| 5,029,991 A | * | 7/1991 | Kohno et al. ............... 359/696 |
| 5,068,680 A | * | 11/1991 | Kawasaki et al. ............ 396/71 |
| 5,087,978 A | * | 2/1992 | Hieda ......................... 348/375 |
| 5,257,058 A | * | 10/1993 | Mabuchi ....................... 396/71 |
| 5,485,208 A | * | 1/1996 | Mabuchi et al. ............ 348/335 |
| 5,848,253 A | * | 12/1998 | Walsh et al. ................. 710/22 |
| 5,877,811 A | * | 3/1999 | Iijima et al. ................ 348/375 |
| 6,130,717 A | * | 10/2000 | Arai et al. .................. 348/360 |
| 6,172,709 B1 | * | 1/2001 | Yamano et al. ............. 348/360 |
| 6,407,774 B1 | * | 6/2002 | Mabuchi et al. ............ 348/360 |
| 6,608,651 B2 | * | 8/2003 | Mabuchi et al. ............ 348/360 |
| 6,717,618 B1 | * | 4/2004 | Yoshikawa .................. 348/360 |
| 6,753,918 B1 | * | 6/2004 | Kanayama ................... 348/335 |

FOREIGN PATENT DOCUMENTS

| | | |
|---|---|---|
| EP | 0 382 222 A2 | 8/1990 |
| EP | 0 679 918 A1 | 11/1995 |
| JP | 02-131226 * | 5/1990 ............ G03B 7/20 |

* cited by examiner

Primary Examiner—James J. Groody
Assistant Examiner—Nhan T. Tran
(74) Attorney, Agent, or Firm—Morgan & Finnegan, L.L.P.

(57) ABSTRACT

This invention provides a lens device to be mounted on a television camera and capable of executing appropriate process even when it is used in combination with the cameras of different characteristics. The lens device has an interface circuit of which characteristics are switchable according to the camera to be used, whereby the characteristics of the lens device match those of the television camera used.

5 Claims, 21 Drawing Sheets

FIG. 8A

| FIG. 8A-1 | FIG. 8A-2 |
|---|---|

FIG. 8A-1

| CAMERA MAKER | CAMERA CODE 8bit | ZOOM GAIN | ZOOM REFERENCE VOLTAGE | FOCUS GAIN | FOCUS REFERENCE VOLTAGE |
|---|---|---|---|---|---|
| A COMPANY | 0 | 833 (DECIMAL NUMERAL) | Ref17 | 800 (DECIMAL NUMERAL) | Ref17 |
| B COMPANY | 1 | 666 (DECIMAL NUMERAL) | Ref18 | 700 (DECIMAL NUMERAL) | Ref18 |
| C COMPANY | 2 | 400 (DECIMAL NUMERAL) | Ref19 | 400 (DECIMAL NUMERAL) | Ref19 |
| D COMPANY | 3 | 700 (DECIMAL NUMERAL) | Ref19 | 700 (DECIMAL NUMERAL) | Ref19 |
| E COMPANY | 4 | 800 (DECIMAL NUMERAL) | Ref19 | 800 (DECIMAL NUMERAL) | Ref19 |
| F COMPANY | 5 | 900 (DECIMAL NUMERAL) | Ref18 | 900 (DECIMAL NUMERAL) | Ref18 |
| G COMPANY | 6 | 300 (DECIMAL NUMERAL) | Ref17 | 300 (DECIMAL NUMERAL) | Ref17 |
| H COMPANY | 7 | 500 (DECIMAL NUMERAL) | Ref17 | 500 (DECIMAL NUMERAL) | Ref17 |
| I COMPANY | 8 | 500 (DECIMAL NUMERAL) | Ref18 | 500 (DECIMAL NUMERAL) | Ref18 |
| J COMPANY | 9 | 800 (DECIMAL NUMERAL) | Ref19 | 800 (DECIMAL NUMERAL) | Ref19 |
| K COMPANY | A | 700 (DECIMAL NUMERAL) | Ref18 | 700 (DECIMAL NUMERAL) | Ref18 |
| L COMPANY | B | 900 (DECIMAL NUMERAL) | Ref19 | 900 (DECIMAL NUMERAL) | Ref19 |
| M COMPANY | C | 700 (DECIMAL NUMERAL) | Ref19 | 700 (DECIMAL NUMERAL) | Ref19 |
| N COMPANY | D | 700 (DECIMAL NUMERAL) | Ref18 | 700 (DECIMAL NUMERAL) | Ref18 |
| O COMPANY | E | 600 (DECIMAL NUMERAL) | Ref18 | 600 (DECIMAL NUMERAL) | Ref18 |

FIG. 8A-2

| IRIS GAIN 16bit | IRIS REFERENCE VOLTAGE | bit DATA CAMERA CONTROL 8bit | bit DATA CAMERA ANSWER 8bit |
|---|---|---|---|
| 800 (DECIMAL NUMERAL) | Ref17 | 00100011B (BIT NUMERAL) | 00100011B (BIT NUMERAL) |
| 700 (DECIMAL NUMERAL) | Ref18 | 01011100B (BIT NUMERAL) | 01011100B (BIT NUMERAL) |
| 400 (DECIMAL NUMERAL) | Ref19 | 10000011B (BIT NUMERAL) | 10000011B (BIT NUMERAL) |
| 700 (DECIMAL NUMERAL) | Ref19 | 00001111B (BIT NUMERAL) | 00001111B (BIT NUMERAL) |
| 800 (DECIMAL NUMERAL) | Ref18 | 00111110B (BIT NUMERAL) | 00111110B (BIT NUMERAL) |
| 900 (DECIMAL NUMERAL) | Ref17 | 01101100B (BIT NUMERAL) | 01101100B (BIT NUMERAL) |
| 300 (DECIMAL NUMERAL) | Ref17 | 00101101B (BIT NUMERAL) | 00101101B (BIT NUMERAL) |
| 500 (DECIMAL NUMERAL) | Ref18 | 10101001B (BIT NUMERAL) | 10101001B (BIT NUMERAL) |
| 500 (DECIMAL NUMERAL) | Ref19 | 10101000B (BIT NUMERAL) | 10101000B (BIT NUMERAL) |
| 800 (DECIMAL NUMERAL) | Ref18 | 10011001B (BIT NUMERAL) | 10011001B (BIT NUMERAL) |
| 700 (DECIMAL NUMERAL) | Ref19 | 10011000B (BIT NUMERAL) | 10011000B (BIT NUMERAL) |
| 900 (DECIMAL NUMERAL) | Ref19 | 10011011B (BIT NUMERAL) | 10011011B (BIT NUMERAL) |
| 700 (DECIMAL NUMERAL) | Ref18 | 01001011B (BIT NUMERAL) | 01001011B (BIT NUMERAL) |
| 700 (DECIMAL NUMERAL) | Ref18 | 10110011B (BIT NUMERAL) | 10110011B (BIT NUMERAL) |
| 600 (DECIMAL NUMERAL) | Ref18 | 00000010B (BIT NUMERAL) | 00000010B (BIT NUMERAL) |

FIG. 8B

| CAMERA MAKER | TALLY ON 8bit bit7 | EXT 2XON 8bit bit6 | IRISAUTO 8bit bit5 | PPON 8bit bit4 | HEATER ON 8bit bit3 | 16:9 ON 8bit bit2 | ZOOM REMOTE 8bit bit1 | FOCUS REMOTE 8bit bit0 |
|---|---|---|---|---|---|---|---|---|
| A COMPANY | 0 | 0 | 1 | 0 | 0 | 0 | 1 | 1 |
| B COMPANY | 0 | 1 | 0 | 1 | 1 | 1 | 0 | 0 |
| C COMPANY | 1 | 0 | 0 | 0 | 0 | 0 | 1 | 1 |
| D COMPANY | 0 | 0 | 0 | 1 | 1 | 1 | 1 | 1 |
| E COMPANY | 0 | 1 | 1 | 0 | 1 | 1 | 1 | 0 |
| F COMPANY | 0 | 0 | 1 | 0 | 1 | 1 | 0 | 0 |
| G COMPANY | 0 | 0 | 1 | 0 | 1 | 0 | 0 | 1 |
| H COMPANY | 1 | 0 | 1 | 1 | 1 | 0 | 0 | 1 |
| I COMPANY | 1 | 0 | 0 | 1 | 1 | 0 | 0 | 0 |
| J COMPANY | 1 | 0 | 0 | 0 | 1 | 0 | 0 | 1 |
| K COMPANY | 1 | 1 | 0 | 1 | 1 | 0 | 1 | 0 |
| L COMPANY | 1 | 0 | 1 | 0 | 0 | 0 | 1 | 1 |
| M COMPANY | 0 | 1 | 0 | 0 | 1 | 0 | 1 | 1 |
| N COMPANY | 1 | 0 | 0 | 0 | 0 | 0 | 1 | 1 |
| O COMPANY | 0 | 0 | 0 | 0 | 0 | 0 | 1 | 0 |

FIG. 8C

| bit7 | bit6 | bit5 | bit4 | bit3 | bit2 | bit1 | bit0 |
|------|------|------|------|------|------|------|------|
| 0    | 1    | 1    | 1    | 0    | 0    | 0    | 0    |

FIG. 8D

| | bit7 | bit6 | bit5 | bit4 | bit3 | bit2 | bit1 | bit0 |
|---|------|------|------|------|------|------|------|------|
| A COMPANY | 0 | 0 | 1 | 0 | 0 | 0 | 1 | 1 |
| INPUT     | 0 | 1 | 1 | 1 | 0 | 0 | 0 | 0 |
| EXOR      | 0 | 1 | 0 | 1 | 0 | 0 | 1 | 1 |

FIG. 8E

| | bit7 | bit6 | bit5 | bit4 | bit3 | bit2 | bit1 | bit0 |
|---|------|------|------|------|------|------|------|------|
| B COMPANY | 0 | 1 | 0 | 1 | 1 | 1 | 0 | 0 |
| INPUT     | 0 | 1 | 1 | 1 | 0 | 0 | 0 | 0 |
| EXOR      | 0 | 0 | 1 | 0 | 1 | 1 | 0 | 0 |

FIG. 9

| COMMAND PORTION 1byte | DATA PORTION (DATA PORTION HAS CHANGEABLE AREA) |
|---|---|

FIG. 10A

| FROM MAIN PCB 3 TO CAMERA INTERFACE BOARD 9 |
|---|
| CAMERA CODE COMMAND |
| ANALOG DATA OUTPUT IRIS COMMAND |
| ANALOG DATA OUTPUT ZOOM COMMAND |
| ANALOG DATA OUTPUT FOCUS COMMAND |
| DIGITAL I/O OUTPUT COMMAND |
| DISPLAY DEVICE DATA COMMAND |

FIG. 10B

| FROM CAMERA INTERFACE BOARD 9 TO MAIN PCB 3 |
|---|
| AUXILIARY SWITCH DIGITAL I/O DATA COMMAND |
| CAMERA INPUT DIGITAL I/O DATA COMMAND |
| CAMERA ANALOG IRIS DATA COMMAND |
| CAMERA ANALOG ZOOM DATA COMMAND |
| CAMERA ANALOG FOCUS DATA COMMAND |

FIG. 11A

| RECEIVING RAM 21 DATA ADDRESS |
|---|
| CAMERA CODE |
| IRIS FOLLOW |
| ZOOM FOLLOW |
| FOCUS FOLLOW |
| DIGITAL I/O OUTPUT |
| INDICATING DATA |

FIG. 11B

| TRANSMITTING RAM 21 DATA ADDRESS |
|---|
| IRIS CONTROL |
| ZOOM CONTROL |
| FOCUS CONTROL |
| DIGITAL I/O INPUT |
| MOUNT SWITCH INPUT |

FIG. 18

| LENS CODE | LENS CODE 8bit | ZOOM, FOCAL LENGTH TABLE | FOCUS, DISTANCE TO OBJECT TABLE |
|---|---|---|---|
| 20X | 0 | 20X TABLE | 20X TABLE |
| 50X | 1 | 50X TABLE | 55X TABLE |
| 55X | 2 | 55X TABLE | 55X TABLE |
| . | . | . | . |
| . | . | . | . |
| . | . | . | . |

FIG. 19

| | FOCAL LENGTH | | | | | | |
|---|---|---|---|---|---|---|---|
| | 7.5 | 9 | . | 150 | . | 450 | 495 |
| 20X WIDE: 7.5mm TELE: 150mm | 0 | 0x0050 | . | 0xFFFF | . | 0xFFFF | 0xFFFF |
| 50X WIDE: 9mm TELE: 450mm | 0 | 0 | 0xAAAA | . | . | 0xFFFF | 0xFFFF |
| 55X WIDE: 9mm TELE: 495mm | 0 | 0 | 0x9900 | . | . | 0xEE00 | 0xFFFF |

FIG. 20

| | F NUMBER | | | | | |
|---|---|---|---|---|---|---|
| | CLOSE | 22 | 16 | 2.8 | . | 2 | 1.4 |
| IRIS DATA | 0 | 0x6000 | 0x7000 | 0xC000 | . | 0xD000 | 0xE000 |

FIG. 21

| KINDS OF COMMAND | ACTUAL COMMAND DATA | bit CONVERSION DATA | MASK DATA |
|---|---|---|---|
| TALLY ON | 0x80 | 10000000 (BINARY DATA) | 10000000 (BINARY DATA) |
| TALLY OFF | 0x81 | 00000000 (BINARY DATA) | 10000000 (BINARY DATA) |
| EXT 2X ON | 0x82 | 01000000 (BINARY DATA) | 01000000 (BINARY DATA) |
| EXT 2X OFF | 0x83 | 00000000 (BINARY DATA) | 01000000 (BINARY DATA) |
| IRIS AUTO ON | 0x84 | 00100000 (BINARY DATA) | 00100000 (BINARY DATA) |
| IRIS AUTO OFF | 0x85 | 00000000 (BINARY DATA) | 00100000 (BINARY DATA) |
| PP ON | 0x86 | 00010000 (BINARY DATA) | 00010000 (BINARY DATA) |
| PP OFF | 0x87 | 00000000 (BINARY DATA) | 00010000 (BINARY DATA) |
| HEATER ON | 0x88 | 00001000 (BINARY DATA) | 00001000 (BINARY DATA) |
| HEATER OFF | 0x89 | 00000000 (BINARY DATA) | 00001000 (BINARY DATA) |
| 16:9 MODE ON | 0x8a | 00000100 (BINARY DATA) | 00000100 (BINARY DATA) |
| 16:9 MODE OFF | 0x8b | 00000000 (BINARY DATA) | 00000100 (BINARY DATA) |
| FOCUS REMOTE MODE ON | 0x8c | 00000010 (BINARY DATA) | 00000010 (BINARY DATA) |
| FOCUS REMOTE MODE OFF | 0x8d | 00000000 (BINARY DATA) | 00000010 (BINARY DATA) |
| ZOOM REMOTE MODE ON | 0x8e | 00000001 (BINARY DATA) | 00000001 (BINARY DATA) |
| ZOOM LOCAL MODE OFF | 0x8f | 00000000 (BINARY DATA) | 00000001 (BINARY DATA) |

FIG. 22A

| COMMUNICATION COMMAND FROM CAMERA TO LENS |
|---|
| IRIS F NUMBER CONTROL COMMAND |
| ZOOM FOCAL LENGTH CONTROL COMMAND |
| FOCUS OBJECT DISTANCE CONTROL COMMAND |
| LENS ON/OFF CONTROL COMMAND |

FIG. 22B

| TRANSMISSION COMMAND FROM LENS TO CAMERA |
|---|
| IRIS F NUMBER FOLLOW COMMAND |
| ZOOM, FOCAL LENGTH FOLLOW COMMAND |
| FOCUS, OBJECT DISTANCE FOLLOW COMMAND |
| LENS CONTROL ON/OFF ANSWER COMMAND |

FIG. 23A

| COMMUNICATION FROM MAIN PCB 3 TO CAMERA INTERFACE BOARD 9 |
|---|
| LENS CODE COMMAND |
| IRIS FOLLOW DATA COMMAND |
| ZOOM FOLLOW DATA COMMAND |
| FOCUS FOLLOW DATA COMMAND |
| DIGITAL I/O OUTPUT (ANSWER TO CAMERA) INDICATING DATA |

FIG. 23B

| COMMUNICATION FROM CAMERA INTERFACE BOARD 9 TO MAIN PCB 3 |
|---|
| IRIS CONTROL COMMAND |
| ZOOM CONTROL COMMAND |
| FOCUS CONTROL COMMAND |
| LENS ON/OFF CONTROL COMMAND |
| MOUNT SWITCH INPUT DATA COMMAND |

FIG. 24A

| DATA ADDRESS IN RAM 21 FOR TRANSMITTING TO MAIN PCB 3 |
|---|
| IRIS CONTROL |
| ZOOM CONTROL |
| FOCUS CONTROL |
| DIGITAL I/O INPUT (LENS CONTROL SIGNAL FROM CAMERA) |
| MOUNT SWITCH INPUT |

FIG. 24B

| DATA ADDRESS IN RAM 21 FOR TRANSMITTING TO CAMERA |
|---|
| IRIS NUMBER FOLLOW |
| ZOOM, FOCUS DISTANCE FOLLOW |
| FOCUS, DISTANCE TO OBJECT FOLLOW |
| DIGITAL I/O OUTPUT (ANSWER TO CAMERA) |

OPTICAL DEVICE

BACKGROUND OF THE INVENTION

1. Field of the Invention

The present invention relates to an optical device such a television lens capable of controlling a lens iris, an extender etc. by an electrical signal from a television camera and returning the lens status by an electrical signal to the camera.

2. Related Background Art

The television lens for broadcasting is capable of controlling lens operations such as iris, extender, tally etc. by electrical signals from the television camera, and returning the lens status such as positions of extender, iris, zooming and focusing to the television camera by electrical signals.

The exchange of such signals is executed by a connector provided at the junction between the camera and the lens, but the kind of the connector, the pin assignment to the signals and the signal level depend of the manufacturer of the television camera.

Also the mechanical configuration of the joint (hereinafter called mount) between the television camera and the lens depends of the manufacturer of the television cameras. FIGS. 6 and 7 show different mount shapes adopted by different manufacturers A and B. For this reason, even a same lens is slightly modified for the respective television camera manufacturer.

To deal with such situation, in the lens unit, each manufacturers preparates a mount for mechanically adapting to different television cameras and provides a variation of set, adjustment, or replacement of the board in the lens for electrically adapting to different television cameras.

Thus, a lens of a same optical performance can be adapted to the different mechanical configurations and the different electrical interfaces of the cameras, with the minimum replacement of parts.

FIG. 5 shows a conventional lens system.

Electrical signals from a camera 8 are directly input to a main process circuit board (PCB) 43 of a lens 41, through bidirectional connectors 7 and a mount 44 of the television lens and the television camera. The PCB 43 executes various operations such as auto focusing and auto iris control.

The mount 44 of the lens 41 is also provided with an auxiliary switch 45 and an indicator 46, which are directly connected also to the PCB 43.

For matching with the electrical interface adopted by each camera manufacturer, there are executed exclusive wiring and resetting of the main PCB 43, or replacement to an exclusive circuit board and exclusive adjustment for the camera manufacturer.

In such method, however, the electrical interface has to be matched with each camera manufacturer, so that the electrical adjusting and setting methods can only be determined when the camera is determined. Consequently there are required various adjusting methods, leading to complicated electrical adjustment.

In case the lens is delivered to a rental company, such lens has to be mounted on the cameras of various manufacturers, so that the replacement of the above-mentioned mount and electrical interface is often executed by the user (rental company) who is sometimes required to execute complex electrical adjustments.

SUMMARY OF THE INVENTION

One aspect of the application is to provide an optical device capable of unifying the adjusting method and simplifying the switching of the electrical interface, in order to avoid such complexity in the electrical adjustments.

One aspect of the application is to provide an optical device adapted for connection with various camera, and comprising a connector for electrical connection with the camera, a process circuit, and an interface circuit connected between the process circuit and the connector, wherein the interface circuit is so constructed that the circuit characteristics or the standards for handling the interface or the signals are rendered switchable in order to adapt the process to different cameras.

One aspect of the application is to provide an optical device comprising designation means for designating a camera, wherein the aforementioned characteristics, interface or circuit characteristics are rendered switchable in accordance with the camera designated by the designation means.

Still other aspects of the present invention, and the features thereof, will become fully apparent from the following description of the embodiments, to be taken in conjunction with the attached drawings.

BRIEF DESCRIPTION OF THE DRAWINGS

FIG. 8A which is composed of FIGS. 8A-1 and 8A-2 are tables showing data of an in-lens conversion table for different camera manufactures;

FIG. 8B is a table showing content of bit signals of bit data camera answer for different camera manufactures and a part of the conversion data table;

FIG. 8C is a table showing bit data before conversion;

FIG. 8D is a table showing bit data converted with the conversion data of the manufacturer A;

FIG. 8E is a table showing bit data converted with the conversion data of the manufacturer B;

FIG. 9 is a table showing the data format of communication between the lens and the camera interface board;

FIG. 10A is a table showing communication commands from the main PCB 3 to the camera interface board 9;

FIG. 10B is a table showing communication commands from the camera interface board 9 to the main PCB 3;

FIG. 11A is a table showing transmission data addresses in a RAM 21;

FIG. 11B is a table showing reception data addresses in the RAM 21;

FIG. 18 is a table showing correspondence between zooming, focusing and lens magnification;

FIG. 19 is a conversion table for lens on/off control data;

FIG. 20 is a position conversion table corresponding to iris F-number;

FIG. 21 is a table showing communication commands between the lens and the camera interface board;

FIG. 22A is a table showing communication commands from the camera to the lens;

FIG. 22B is a table showing communication commands from the lens to the camera;

FIG. 23A is a table showing communication commands from the main PCB 3 to the camera interface board 9;

FIG. 23B is a table showing communication commands from the camera interface board 9 to the main PCB 3;

FIG. 24A is a table showing transmission data addresses of the RAM 21 to the main PCB 3; and FIG. 24B is a table showing transmission data addresses of the RAM 21 to the camera.

DESCRIPTION OF THE PREFERRED EMBODIMENTS

First Embodiment

Figure 1:
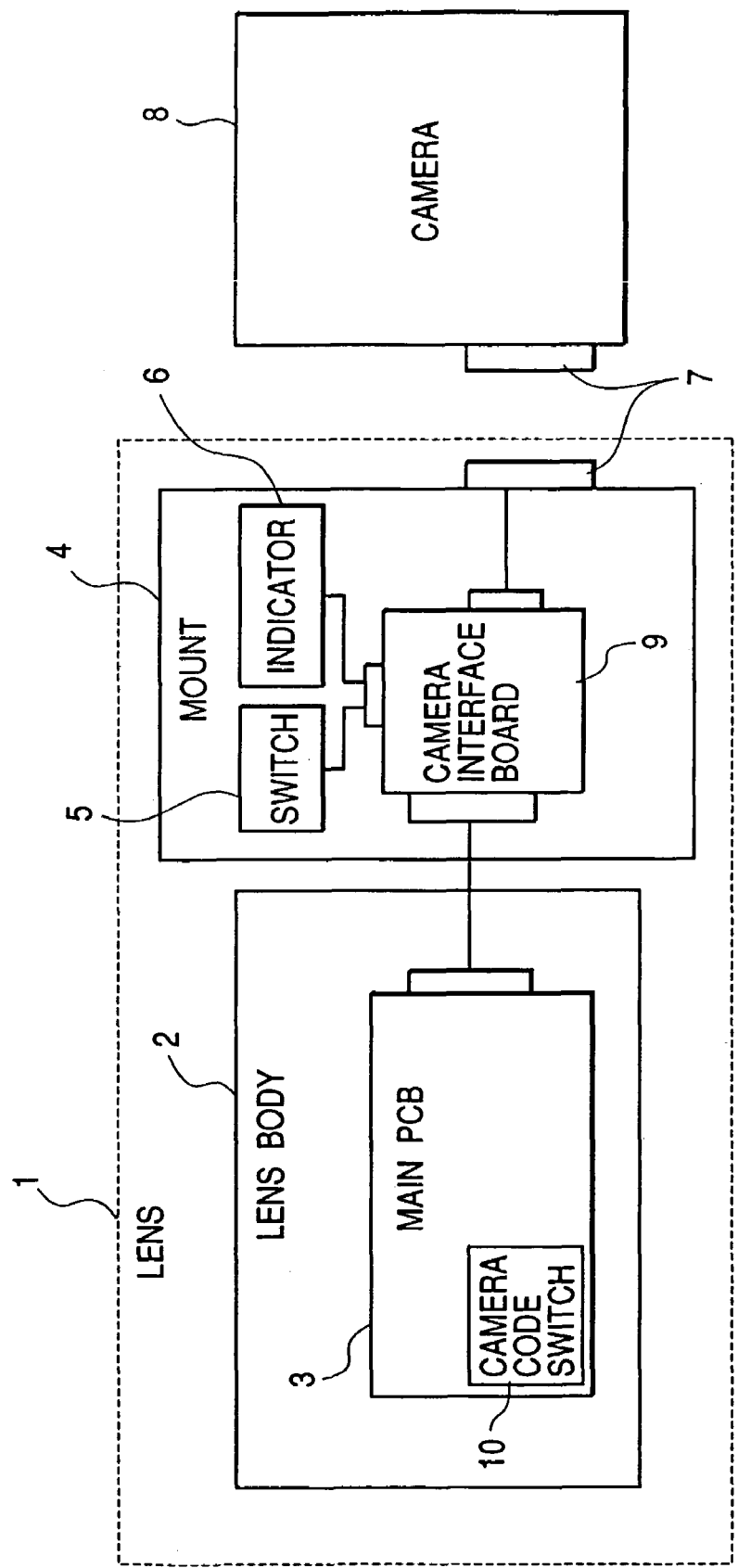
FIG. 1 is a view showing a lens system embodying the present invention.

FIG. 1 is a block diagram showing a lens system of a first embodiment.

The lens 1 in the present embodiment is divided into a main lens body 2 and a mount 4. The main lens body 2 is provided with a main circuit board (PCB) 3, which is a circuit board for controlling the lens. The PCB 3 is provided with a camera code switch 10, which outputs a hexadecimal code corresponding to the camera manufacturer by a manual operation of a rotary switch, whereby the PCB 3 identifies the kind of the camera.

The mount 4 is provided with an auxiliary switch 5 and an auxiliary indicator 6, which are connected to a camera interface board 9. The television lens 1 and the television camera 8 are electrically connected through connectors 7. The auxiliary switch 5 is used by the lens for controlling itself, and executes on/off control of lens tally and manual/servo switching of the extender. The auxiliary indicator 6 showing the positions of iris, zooming and extender of the lens. The electrical signals between the connectors 7 include analog signals and digital signals. The analog signal such as a position voltage for controlling the iris, zoom, focus and the like are transmitted from the camera to the lens, and voltages showing the current iris, zoom and focus positions are returns from the lens to the camera. These voltages are different from camera to camera. Digital signals from the camera execute switching operations, such as on/off control of the lens tally, 1X/2X switching of the extender, switching of the control mode for the lens iris, by binary values of 0V(L) and 5V(H), through exclusive pins assigned to the respective control items in the connector 7. Also a digital signal from the lens to the camera indicates whether the extender is in the 1X or 2X position, by binary values of 0V(L)=2X and 5V(H)=1X through an exclusive signal pin in the connector 7. However the polarity of the signal, namely whether the switch is to be turned on at 0V(L) or 5V(H), is different from camera to camera.

In the lens 1, the signal exchange between the main PCB 3 and the camera 8 connected to the lens 1 is executed through a camera interface board 9 incorporated in the mount 4.

The signals from the camera 8, supplied through the connector 7, are received by the lens 1 at the camera interface board 9. These signals are converted, in the camera interface board 9, into the data format in the lens and are then transmitted as serial data to the main PCB 3. All the data of both analog and digital signals are handled as serial data. The above-mentioned data format is a normalization for processing the analog and digital signals in the lens, by the PCB 3. For example, in case the digital signal for tally on/off control to be processed in the PCB 3 is so selected that 0V(L) is for switch-on operation and 5V(H) is for switch-off operation while the digital signal from the camera interface is so formatted that 0V(L) is for switch-on operation and 5V(H) is for switch-on operation, the camera interface board 9 executes conversion to the inverted data. Also in case of an analog signal the camera interface board executes conversion of the command signals for iris, zooming and focusing, which are different from camera to camera, into voltage widths and reference voltage to be actually controlled in the PCB 3.

On the other hand, the serial data supplied from the main PCB 3 to the camera interface board 9 are converted therein into analog and digital signals of the camera interface and are transmitted through the connectors 7 of both sides to the camera 8 connected to the television lens.

Also input or output of the signal to the main PCB 3 for the auxiliary switch 5 and the auxiliary indicator 6 of the mount 4 is executed by the serial communication between the camera interface board 9 and the main PCB 3.

Consequently there only exists a serial communication line between the camera interface board 9 and the main PCB 3, so that the number of the wiring can be reduced.

Figure 7:
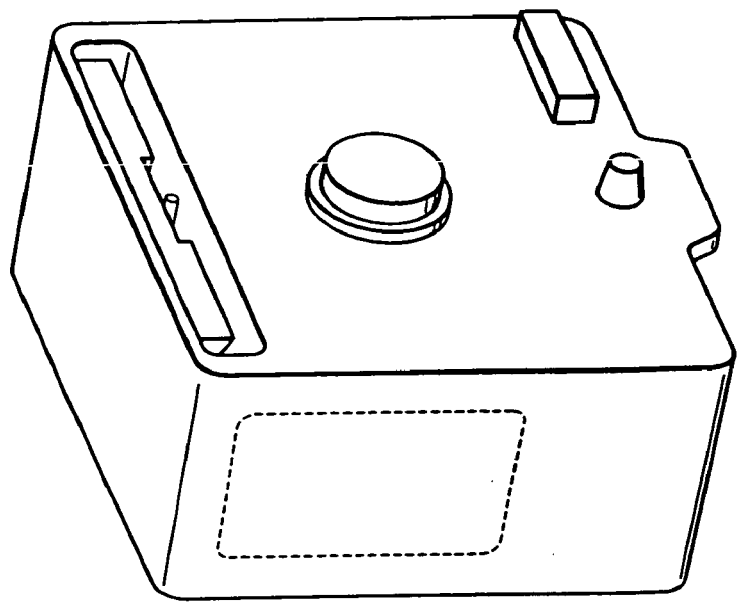
FIG. 7 is a view showing the configuration of the mount of a manufacturer B.
Figure 6:
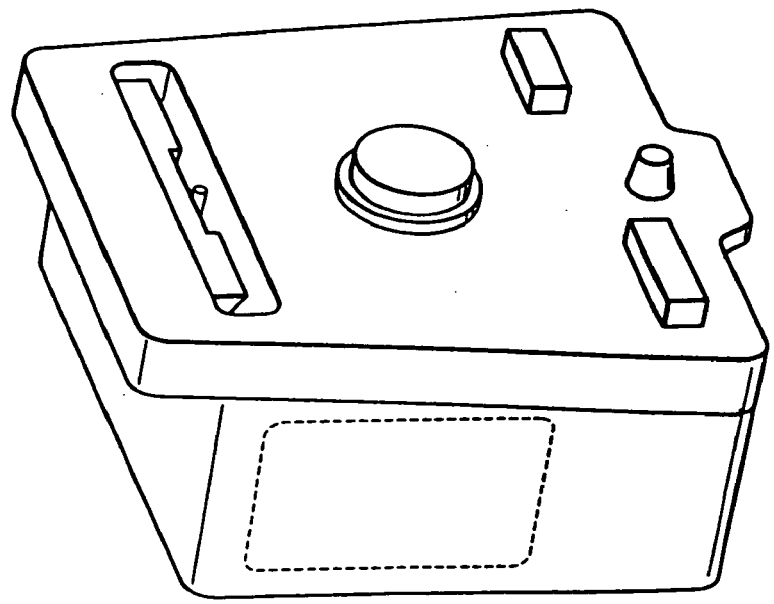
FIG. 6 is a view showing the configuration of the mount of a manufacturer A.

In case the camera 8 is changed from that of the manufacturer A to that of the manufacturer B, the mount 4 of the lens 1 is replaced from that of the manufacturer A as shown in FIG. 6 to that of the manufacturer B as shown in FIG. 7, in order to enable mechanical coupling. The mount of the manufacturer A shown in FIG. 6 and that of the manufacturer B shown in FIG. 7 are mutually different in the mechanical shape, the number of pins in both connectors 7 and the pin assignment therein. The electrical configuration is different only in the wiring from the connector 7 to the camera interface board 9. In such configuration, a camera manufacturer coder, set by a camera code switch 10 provided in the main PCB 3, is transmitted therefrom by serial communication to the camera interface board 9, whereby the camera interface can be switched automatically, and the main PCB 3 and the camera interface board 9 can be used in common.

Figure 2:
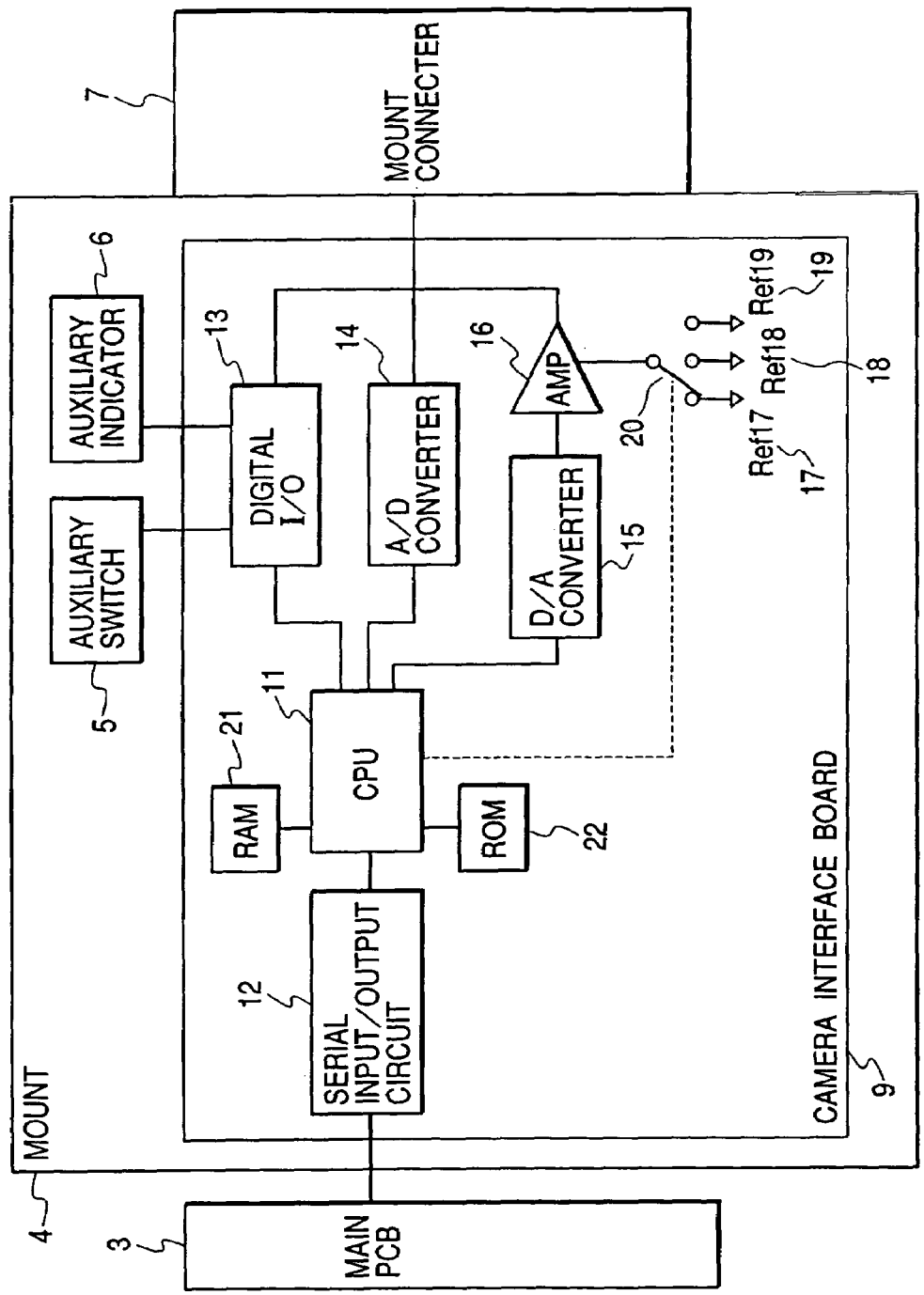
FIG. 2 is a block diagram showing the configuration of a camera interface board.

FIG. 2 is a block diagram showing the configuration of the camera interface board 9.

The camera interface board 9 is provided with a CPU 11, a serial input/output circuit 12 for enabling serial communication between the CPU 11 and the main PCB 3 of the main lens body, and an A/D converter 14 and a D/A converter 15 for enabling analog signal exchange between the CPU 11 and the camera 8.

At the output side of the D/A converter 15 there is provided an amplifier (AMP) 16, for effecting conversion for matching the analog reference voltage of each camera. For effecting such conversion of the reference voltage, the camera interface board 9 is provide with plural reference voltages Ref16, Ref17, Ref18, corresponding to the adaptable cameras, and the level of the voltage outputted from the amplifier 16 is switched according to the shifting of an analog switch 20 by the CPU 11. The switching is conducted for conversion to the output characteristics, corresponding to the camera, and can also be achieved by varying the gain of the amplifier instead of switching the reference voltage level.

A digital I/O interface 13 is provided for digital signal exchange with the camera 8. The digital I/O interface 13 is also connected to the auxiliary switch 5 and the auxiliary indicator 6 of the mount 4 and handles all the digital signal exchange. For data storage, there are provided a RAM 21 and a ROM 22.

FIGS. 8A-1 and 8A-2 show the configuration of a data conversion table, which is composed of zoom gain data (16 bits), zoom reference voltage data (16 bits), focus gain data (16 bits), focus reference voltage data (16 bits), iris gain data (16 bits), iris reference voltage data (16 bits), camera control data (8 bits) and camera answer data (8 bits), provided corresponding to camera codes which in turn correspond to the camera manufacturers or makers.

The serial data are composed of a command portion and a data portion, as shown in FIG. 9.

Figure 3:
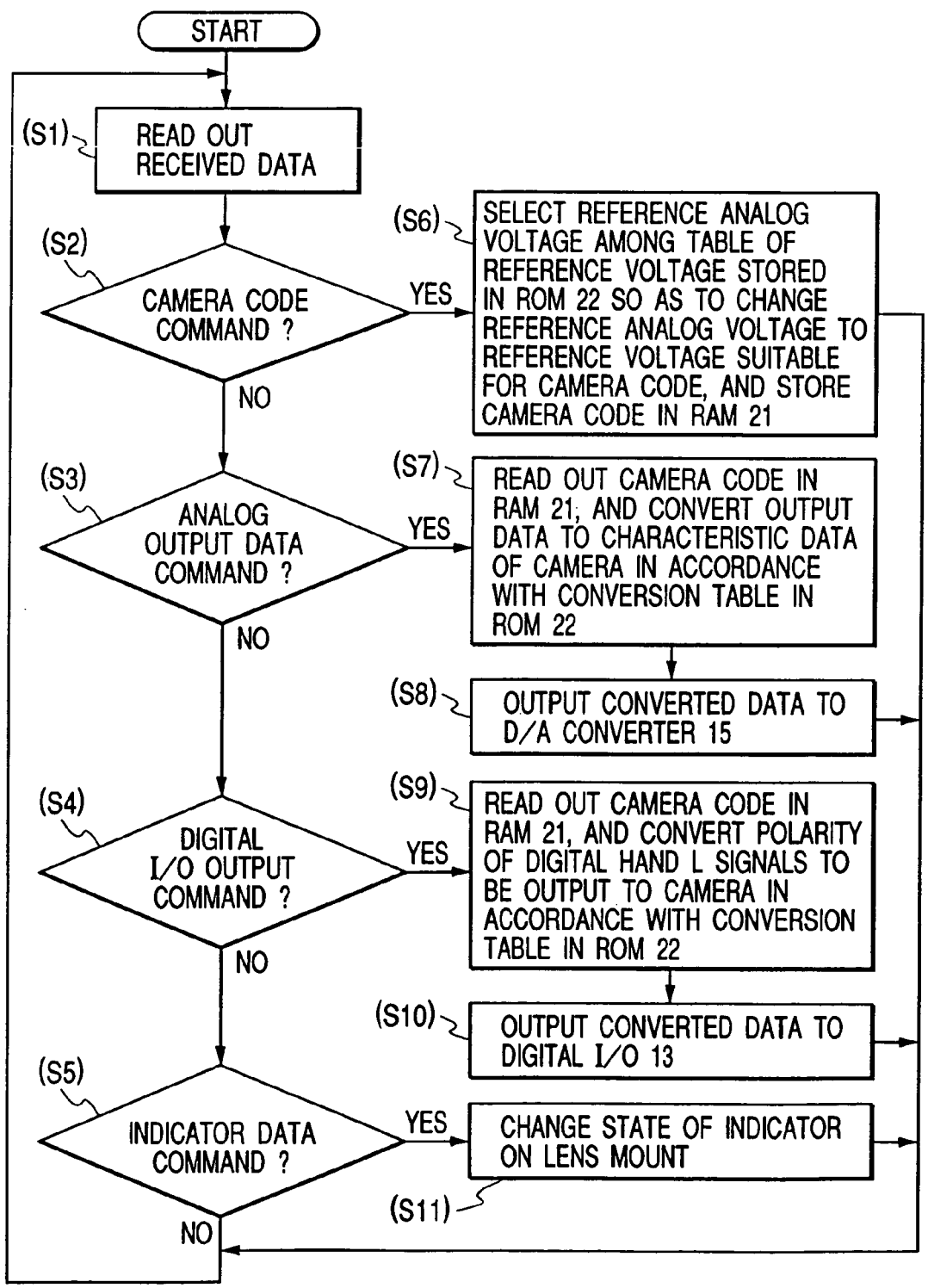
FIG. 3 is a flow chart showing a serial reception sequence from the main PCB.

FIG. 3 is a flow chart showing a serial reception sequence from the main PCB 3, to be executed in the camera interface board 9 shown in FIG. 2.

Data input from the serial input/output circuit 12 are read out by the CPU 11 (S1), and there is discriminated whether the command portion of the serial data is a camera code command (S2). As shown in FIG. 10A, the commands include a camera code command, an analog data output iris command, an analog data output zoom command, an analog data output focus command, a digital I/O output command, and an indicator data command. The analog data output iris command, the analog data output zoom command and the analog data output focus command will be explained collectively as analog data output commands.

If the command portion is a camera code command, the data portions stored in the RAM 21 (S6). Then, based on a voltage selection table (FIGS. 8A-1 and 8A-2) set according to the camera code stored in the ROM 22, the analog switch 20 is shifted to a reference voltage corresponding to the camera, among the reference voltages Ref17 to Ref19. Thus the reference value for the analog voltage to the camera is automatically switched. As shown in FIG. 8A, the camera codes are set from 0 to F corresponding to the manufacturers A to O, and are set by the camera code switch 10 of the main PCB 3. Referring to FIGS. 8A-1 and 8A-2, the CPU 11 shifts the analog switch 20 in such a manner that the reference voltage Ref17 is selected for the manufacturer A and the reference voltage Ref18 is selected for the manufacturer B. If the command portion is not a camera code command, there is discriminated whether it is an analog output data command (S3).

If it is an analog output data command, the data of the data portion are read out. Then, based on the camera code stored in the RAM 21, the level of the analog data is converted according to the conversion table (FIGS. 8A-1 and 8A-2) of the ROM 22 (S7). The conversion is executed in the following manner. As an example, in case of conversion for zooming in FIGS. 8A-1 and 8A-2, the zoom gain is '833' corresponding to the camera code 0 for the manufacturer A. The zoom data ZOOM_DATA are supposed to indicate the difference from the reference voltage. The ZOOM_DATA is multiplied by 833 and divided by 1000. If the entire operating voltage range 6V is the voltage in the lens, there is executed a calculation 6×833/1000=4.998V, thereby achieving a conversion to the output of 5V.

The data thus obtained is converted by the D/A converter 15 into an analog voltage (S8), which is outputted to the camera through the amplifier 16. As the amplifier is subjected to the switching of the reference voltage by the analog switch 20, a voltage corresponding to the sum of such reference voltage and the output of the D/A converter 15 is supplied to the camera. This means that the conversion of the reference voltage and the gain is executed corresponding to the camera.

If the command portion is not an analog output data command, there is discriminated whether it is a digital I/O output command (S4). If it is a digital I/O output command, the data portion is read out, then converted by the conversion table in the ROM 22, according to the camera code stored in the RAM 21 (S9), and the converted data are outputted to the digital I/O interface 13 (S10).

The conversion is executed in the following manner, based on a conversion table shown in FIG. 8B. In the illustrated table, each operation to be executed in the opposite polarity, such as 5V(H signal), is represented by "1", while that in the same polarity, such as 0V (L signal), is represented by "0". In case of setting for the camera of the manufacturer A, there is calculated the exclusive sum (EXOR) of the bit data of the conversion table corresponding to the camera code 0 and the digital I/O output command data (FIG. 8C) from the main PCB 3, and such exclusive sum (EXOR) is according to the converted data to be outputted to the camera (FIG. 8D). Also in case of setting for the camera of the manufacturer B, the conversion is achieved (FIG. 8E) by calculating the exclusive sum (EXOR) of the data of the conversion table corresponding to the camera code 1 and the digital I/O output command data (FIG. 8C) from the main PCB 3. Thus converted data is supplied to the digital I/O 13 to output the answer data of the lens, corresponding to the camera.

It is to be noted, however, that the data bits correspond to the output bit of the digital I/O in hardware.

If the step S4 identifies that the command portion is not a digital I/O output command, there is discriminated whether it is an indicator data command (S5). If it is an indicator data command, the auxiliary indicator 6 provided in the lens mount is renewed by the digital I/O 13 (S11).

After the sequence from S2 to S5, the sequence returns to S1 to read out and process next data in a similar manner.

Figure 4:
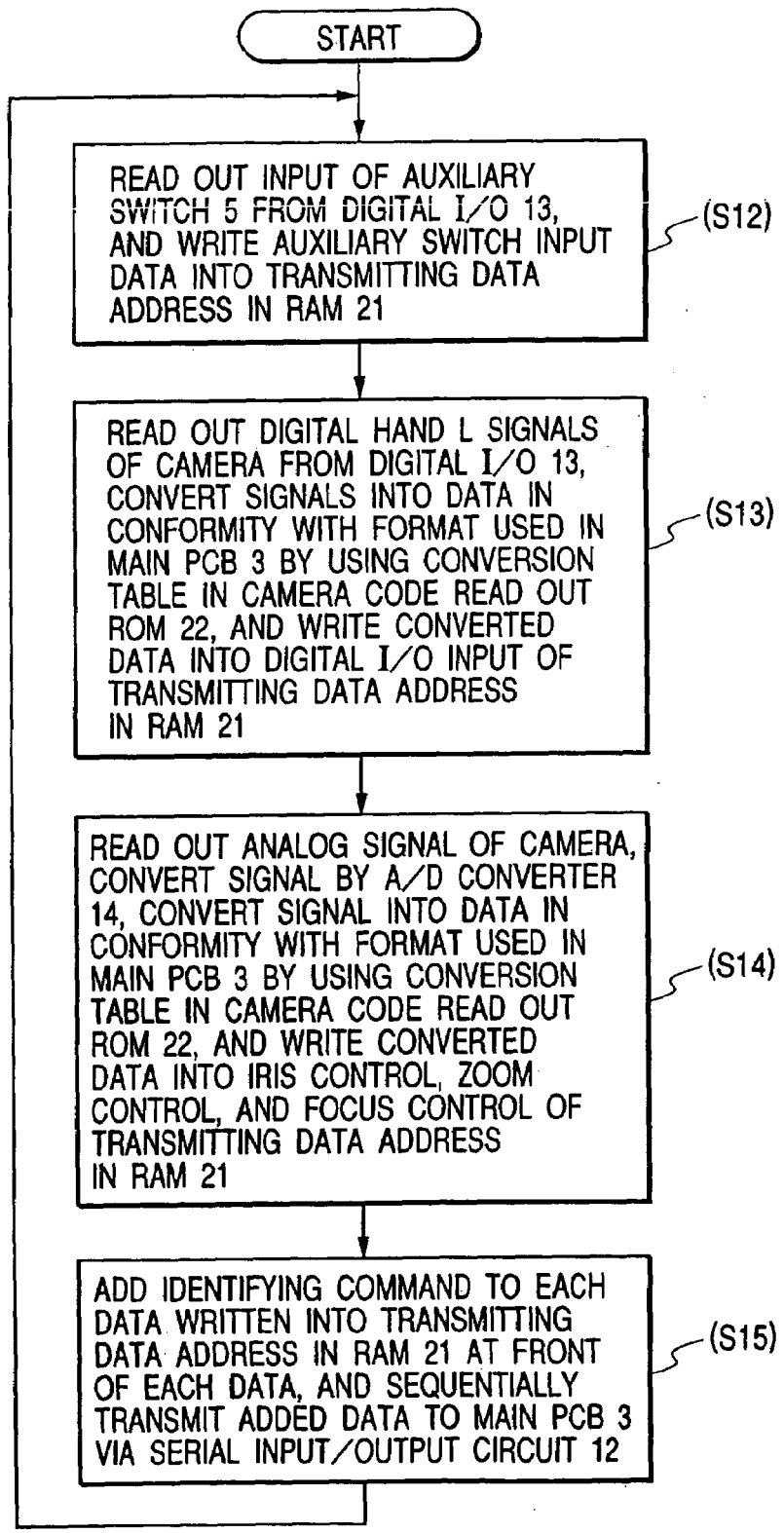
FIG. 4 is a flow chart showing a serial transmission sequence to the main PCB.
Figure 5:
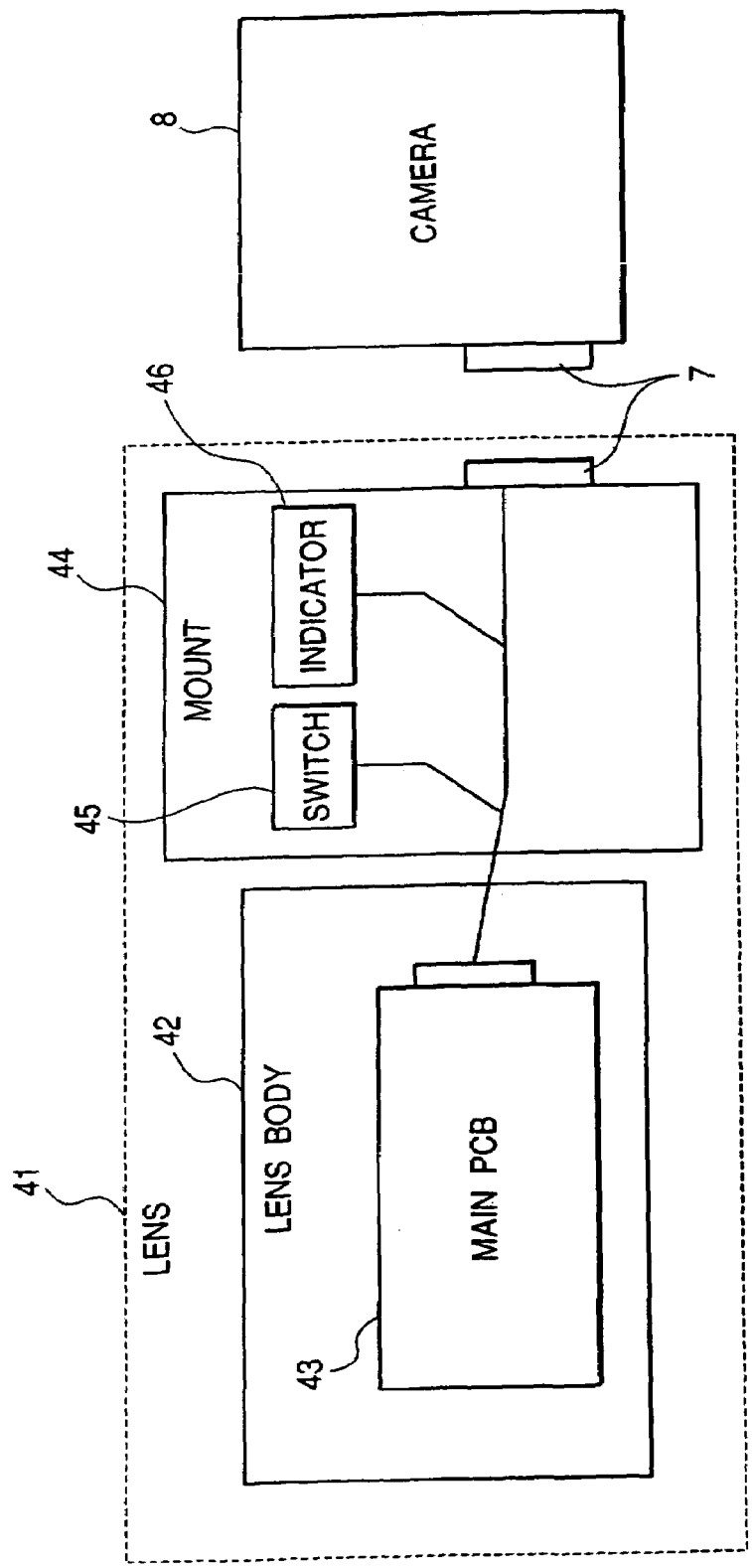
FIG. 5 is a view showing a conventional lens system.

FIG. 4 is a flow chart showing a serial transmission sequence to the main PCB 3, to be executed by the camera interface board 9 shown in FIG. 2.

The serial data are composed, as shown in FIG. 9, of a command portion and a data portion.

The commands include a mount auxiliary switch digital I/O data command, a camera input digital I/O data command, a camera analog iris data command, a camera analog zoom data command, and a camera analog focus data command (FIG. 10B).

The input from the auxiliary switch 5 is stored by the digital I/O 13 in the CPU 11, and the data is written into a mount switch input of the transmission data address in the RAM 21 shown in FIG. 11.

Then the digital input signal from the camera is read from the digital I/O 13 and is converted into data in the lens.

This conversion is executed in the following manner, utilizing the conversion table shown in FIG. 8B.

In case of setting for the camera of the manufacturer A, there is calculated the exclusive sum (EXOR) of the bit data of the conversion table corresponding to the camera code 0 and the camera input digital I/O data (FIG. 8C) from the main PCB 3, as such exclusive sum (EXOR) is according to the converted in-lens data (FIG. 8D). Also in case of setting for the camera of the manufacturer B, the conversion is achieved (FIG. 8E) by calculating the exclusive sum (EXOR) of the data of the conversion table corresponding to the camera code 1 and the camera input digital I/O data (FIG. 8C) from the main PCB 3. Thus converted data is written into a control signal from the camera to the lens, in the transmission data address of the RAM 21 shown in FIG. 11B (S13).

Then the analog signal from the camera is converted by the A/D converter 14 into the in-lens data and stored in the CPU 11 (S14). The conversion is executed in the following manner. As an example, in case of conversion for zooming in FIG. 8A, the zoom gain is '833' corresponding to the camera code 0 for the manufacturer A. The read zoom data ZOOM_DATA are supposed to indicate the difference from the reference voltage. The ZOOM_DATA is multiplied by 1000 and divided by 833. If the entire operating voltage range of 5V is the voltage in the camera, there is executed a calculation 6×1000/833=6.002V, thereby achieving a conversion to the input of 6V. In addition to the zooming explained above, iris and focusing can be processed in a similar manner. The converted data is written into the iris control, zoom control and focus control from the camera of the transmission data address in the RAM 21 shown in FIG. 11B (S14).

Then, the main PCB 3 adds a command for data identification to the data of each transmission data address of the RAM 21 shown in FIG. 11B, and these data are transmitted in succession to the main PCB 3 through the serial input/output circuit 12 (S15).

The sequence from S12 to S15 is executed repeatedly, and such transmission procedure allows the main PCB 3 to process the normalized data in the lens, even if the camera is changed.

In the present embodiment, the camera interface board 9 is provided in the mount 4, but it may also be provided outside the mount 4. Also the main PCB 3 is provided with the camera code switch 10 for changing the setting in case the camera is changed, but it is also possible to provide the camera interface board 9 with such camera code switch 10 whereby the camera interface board 9 executes signal conversion by directly recognizing the camera setting and returns the camera code to the main PCB 3 by serial communication.

Also in the present embodiment, the camera interface board 9 executes conversion of the data to or from the camera and the ROM 22 for the data conversion tables is provided in the camera interface board 9, but it is also possible to execute the data conversion in the main PCB 3 and to provide the main PCB 3 with the ROM 22 for the data conversion tables.

Second Embodiment

Figure 12:
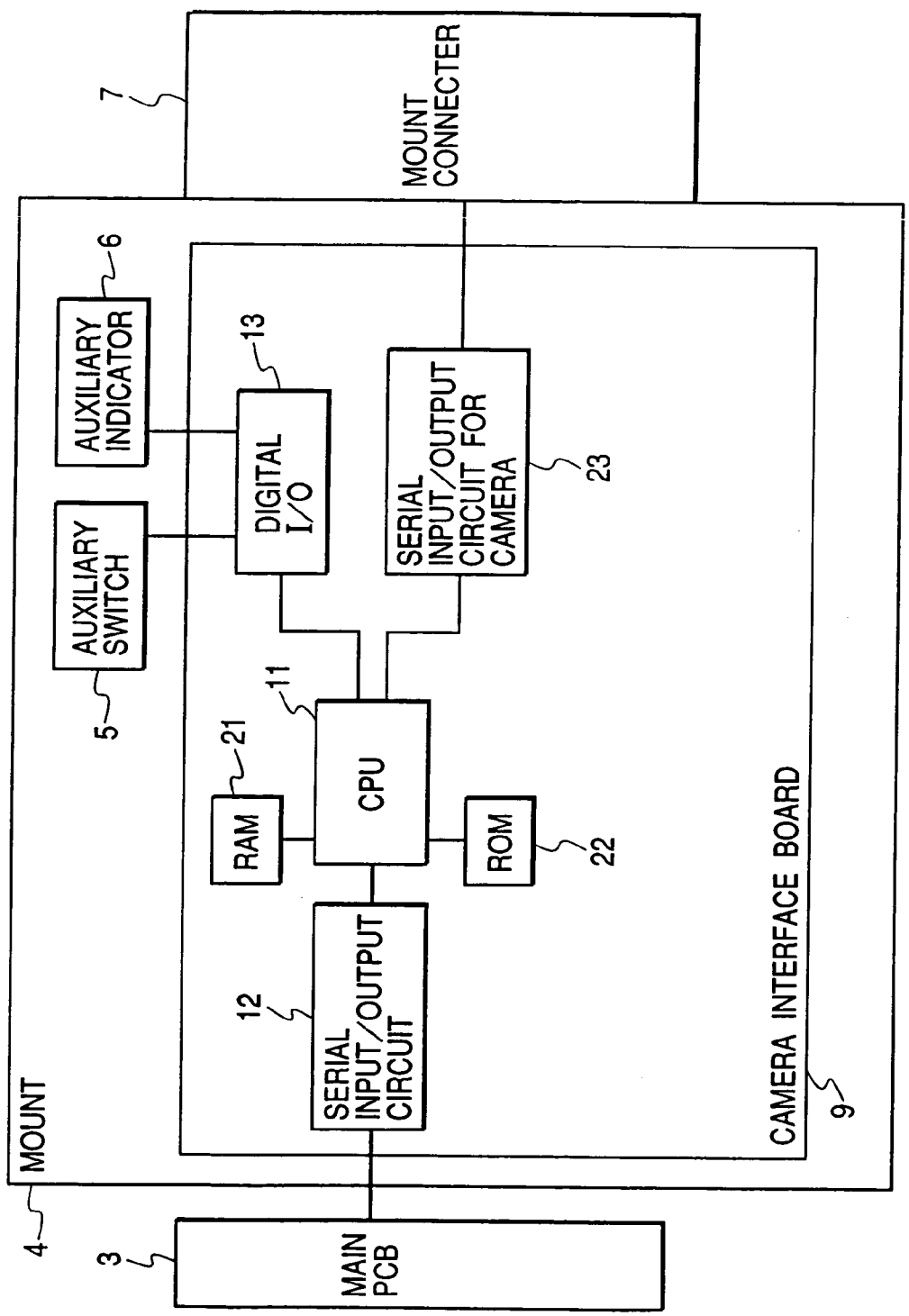
FIG. 12 is a block diagram showing the configuration of the camera interface board in case of serial communication between the camera and the lens.

The second embodiment is different from the first embodiment in such configuration of the camera interface board that the electrical interface between the camera and the lens is achieved by serial communication. FIG. 12 is a block diagram showing the configuration of the camera interface board in case the electrical interface is achieved by serial communication.

The camera interface board 9 is provided with a CPU 11, a serial input/output circuit 12 for serial communication between the CPU 11 and the main PCB 3 of the main lens body, and a camera serial input/output circuit 23 for serial communication between the CPU 11 and the camera 8. The CPU 11 is connected to a RAM 21 for data storage and a ROM 22 for table data.

The CPU 11 is further connected to a digital I/O interface 13, for the auxiliary switch 5 and the auxiliary indicator of the mount 4.

The serial signal supplied from the camera 8 through the connectors 7 is input into by the CPU 11 through the camera serial input/output circuit 23 of the camera interface board 9. The CPU 11 converts the signal into a data format in the lens and transmits it to the main PCB 3 through the serial input/output circuit 12.

The commands from the camera to the lens include, as shown in FIG. 22A, an iris F number control command, a zoom focal length control command, a focus object distance control command, and a lens on/off control command.

Figure 15:
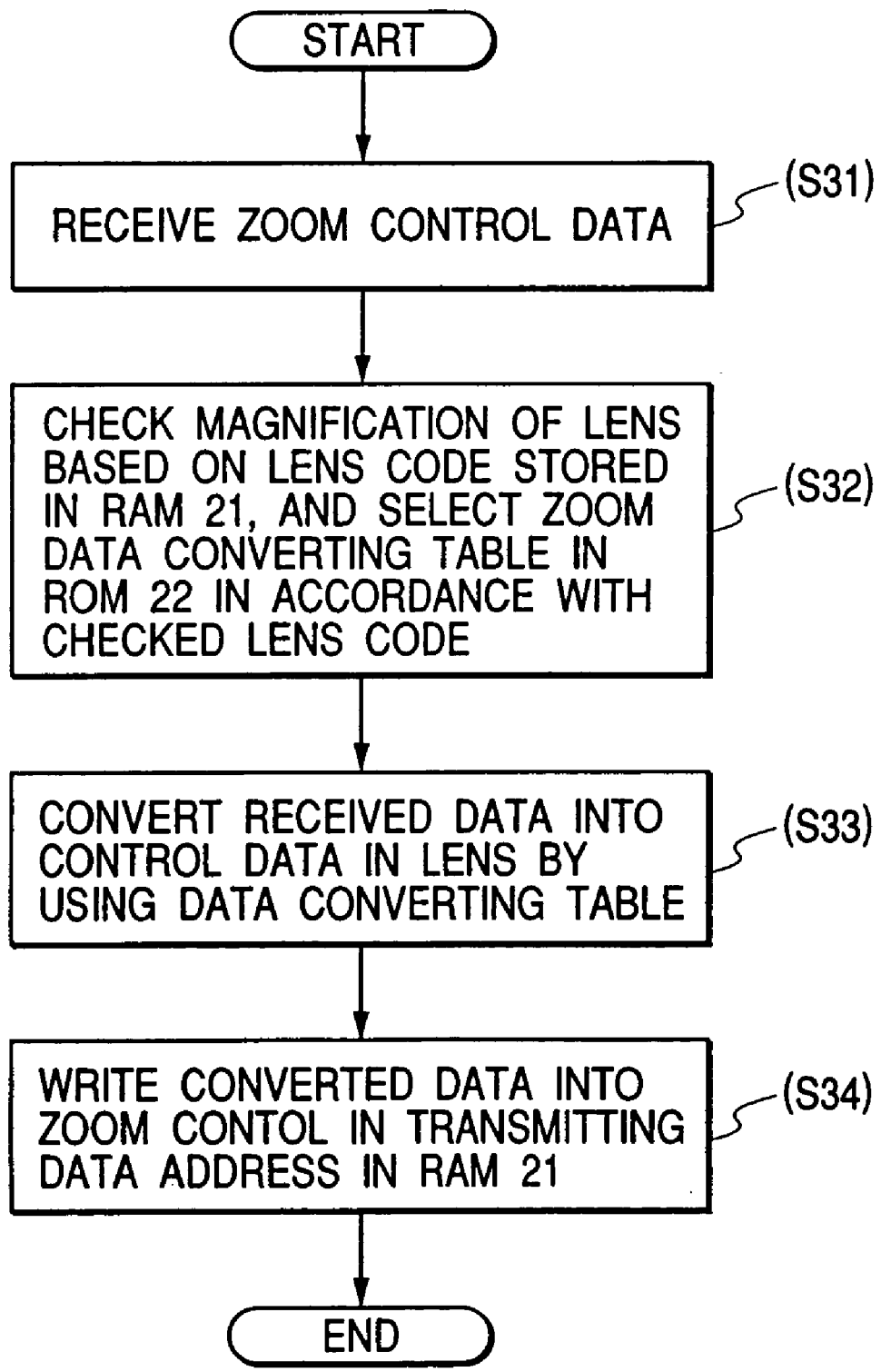
FIG. 15 is a flow chart for zoom/focus control signals by a serial reception sequence from the camera.

The data format mentioned above is a normalization process for actual data processing in the lens. As an example, in case the zoom control data is transmitted from the camera 8 in the form of a focal length, there is executed the conversion into an in-lens position signal for moving the lens to a zoom position corresponding to such focal length. In the following description, the wide angle end and the telephoto end of the lens are respectively represented by 0 and 0xffff. FIG. 15 is a flow chart showing the sequence in case the camera interface board receives zoom control data from the camera. When zoom control data by the focal length is received from the camera (S31), the camera interface board reads out the lens code stored in the RAM 21.

The lens code is transmitted from the main PCB 3 to the camera interface board and is stored in the RAM 21. After the reading of the lens code, a zoom data converting table corresponding to such lens code is selected (S32), and conversion is made by interpolating calculation utilizing the data of such table. This conversion provides zoom position data in the lens. This data is stored in the zoom control of the data address in the RAM 21 for transmission to the main PCB, shown in FIG. 23A (S33). FIG. 19 shows a zoom position data table of the lens corresponding to the focal length control data, wherein "•" indicates omission of the intermediate data.

Similar conversion (data interpolation) is executed for the focus with the table shown in FIG. 18 and for the iris with the table shown in FIG. 20, and the normalized control data in the lens are stored in the focus control and iris control of the data addresses in the RAM 21 for transmission to the main PCB 3, shown in FIG. 24A.

Also in case a lens on/off control command is received, there is executed conversion, based on a conversion table stored in the ROM 22, into data to be actually usable in the lens.

Figure 16:
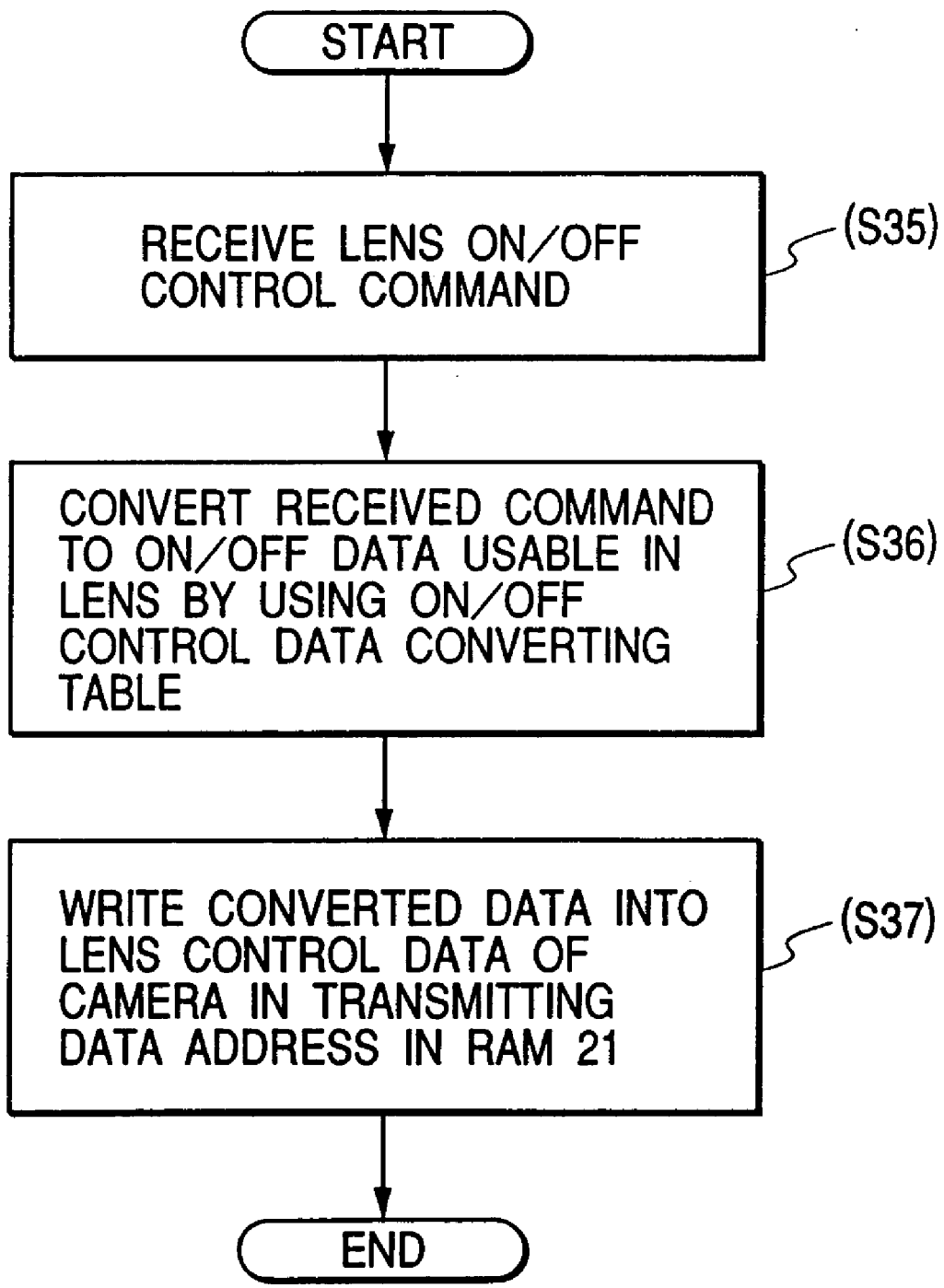
FIG. 16 is a flow chart for lens on/off control by a serial reception sequence from the camera.

FIG. 16 is a flow chart showing the process sequence in case the lens on/off control command is received from the camera. FIG. 21 shows a data conversion table for the commands 0x80 to 0x8f. The table contains bit conversion data for converting these commands into bit data, and mask data required for renewing such bit data. The command can be converted into the data format in the lens, by applying following process to the data for transmission to the lens. For transmission, there is calculated AND of the RAM data which are transmission data to the lens and the mask data, and then calculated OR of thus obtained data and the bit conversion data to prepare renewed RAM data. In this manner there is achieved inverse conversion from the bit data to the command.

Figure 14:
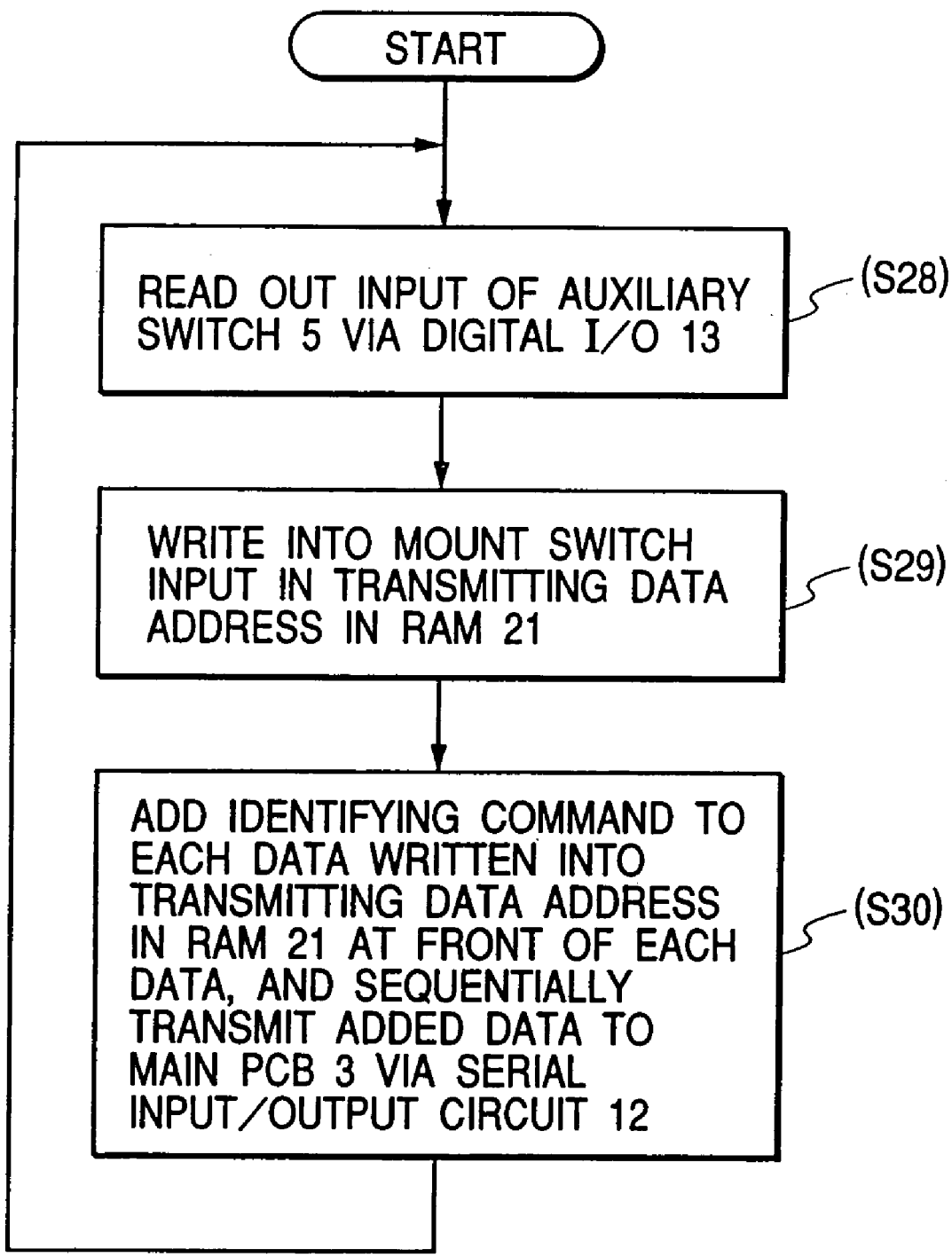
FIG. 14 is a flow chart showing a serial transmission sequence to the main PCB.

FIG. 14 is a flow chart showing the sequence for the communication from the camera interface board 9 to the main PCB 3. The commands in this communication include, as shown in FIG. 23B, an iris control command, a zoom control command, a focus control command, a lens on/off control command, and a mount switch input data command. The iris control command, the zoom control command and the focus control command will be collectively called analog data commands. The input from the auxiliary switch 5 is read from the digital I/O 13 (S28), and the data are stored in the mount switch input of the transmission data address to the main PCB 3, shown in FIG. 24A (S29). The iris control, zoom control, focus control and on/off control from the camera to the lens, stored in the transmission data addresses to the main PCB 3, as shown in FIG. 24A, are stored after data conversion at the reception of the commands from the camera. These commands are respectively given headers for data identification and are transmitted in succession to the main PCB 3 through the serial input/output circuit 12 (S30).

Figure 13:
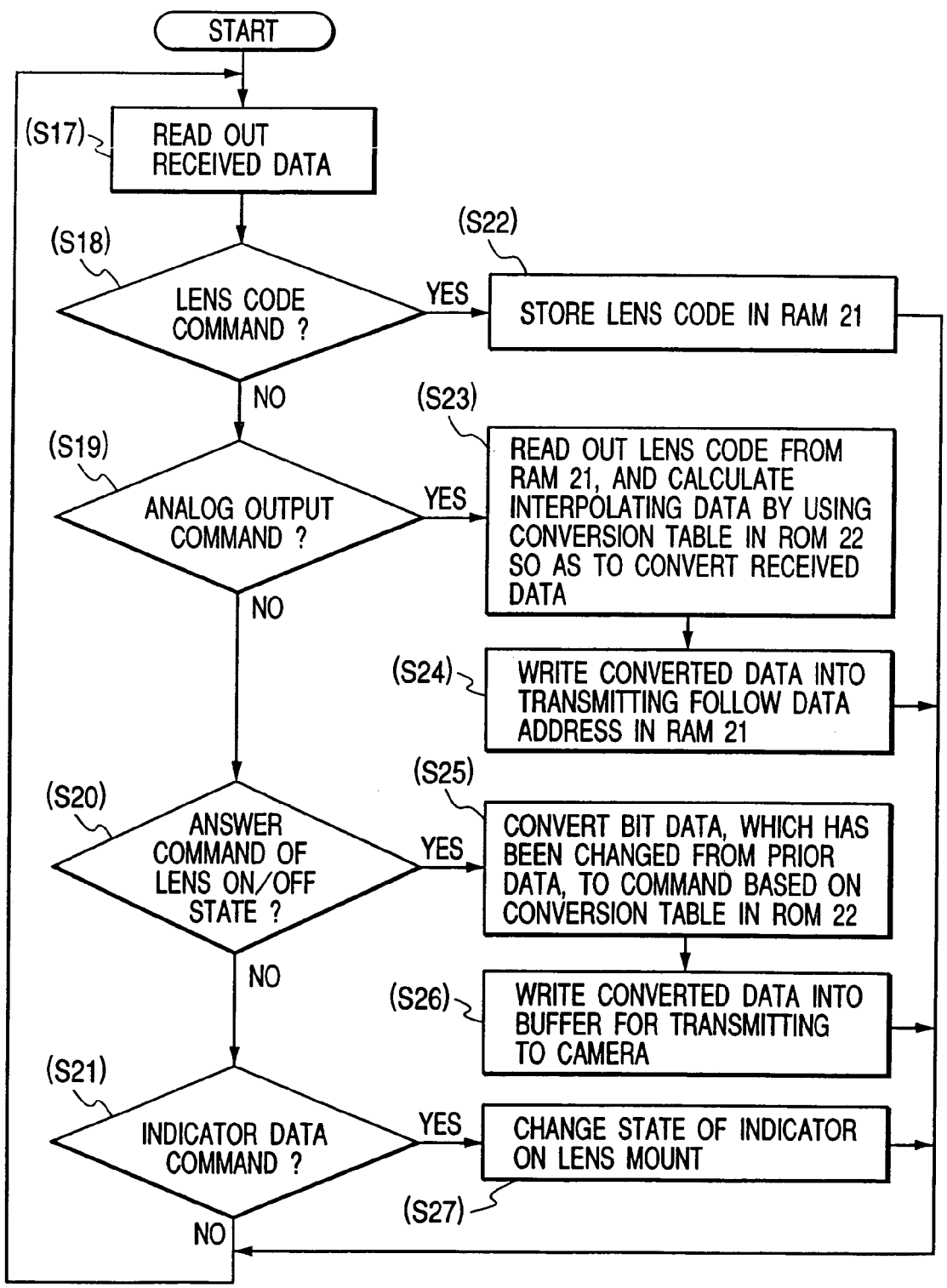
FIG. 13 is a flow chart showing a serial reception sequence from the main PCB.

FIG. 13 is a flow chart showing the sequence of communication from the main PCB 3 to the camera interface board 9, to be executed in the interface board 9 shown in FIG. 12. The communication commands from the main PCB 3 to the camera interface board 9 include, as shown in FIG. 23A, a lens code command, an iris follow command, a zoom follow command, a focus follow command, an answer command to the camera in response to on/off command, and an indicator data command. The iris follow command, zoom follow command and focus follow command will be collectively called analog output data commands.

When the camera interface board reads out the received data (S17), there is discriminated whether it is a lens code command (S18), and, if it is a lens code command, the lens code is stored in the RAM 21 (S19). This lens code is used for conversion for zoom and focus controls.

If it is not a lens code command, there is discriminated whether it is an analog output data command (S19). If it is an analog output data command, the lens code stored in the RAM 21 is read out. Then an interpolating calculation is executed with the conversion tables shown in FIGS. 18 and 20 for conversion into the F-number control in case of iris, the focal length in case of zooming or the object distance in case of focusing, and the obtained data are stored in the iris F-number follow, zoom focal length follow or focus object distance follow of the data addresses for transmission to the camera in the RAM 21, shown in FIG. 23B (S24).

If the command is not an analog output data command, there is discriminated whether it is an answer code for the lens on/off state (S20).

If it is an answer command, data of the RAM 21, different from the preceding one, are converted into a command. The conversion is executed utilizing the conversion table in the ROM 22 shown in FIG. 21, and the command after conversion is stored in a transmission buffer for transmission to the camera. If the command is not an answer command, there is discriminated whether it is an indicator turn-on command (S21), and, if so, the data for the indicator in the mount are renewed.

Figure 17:
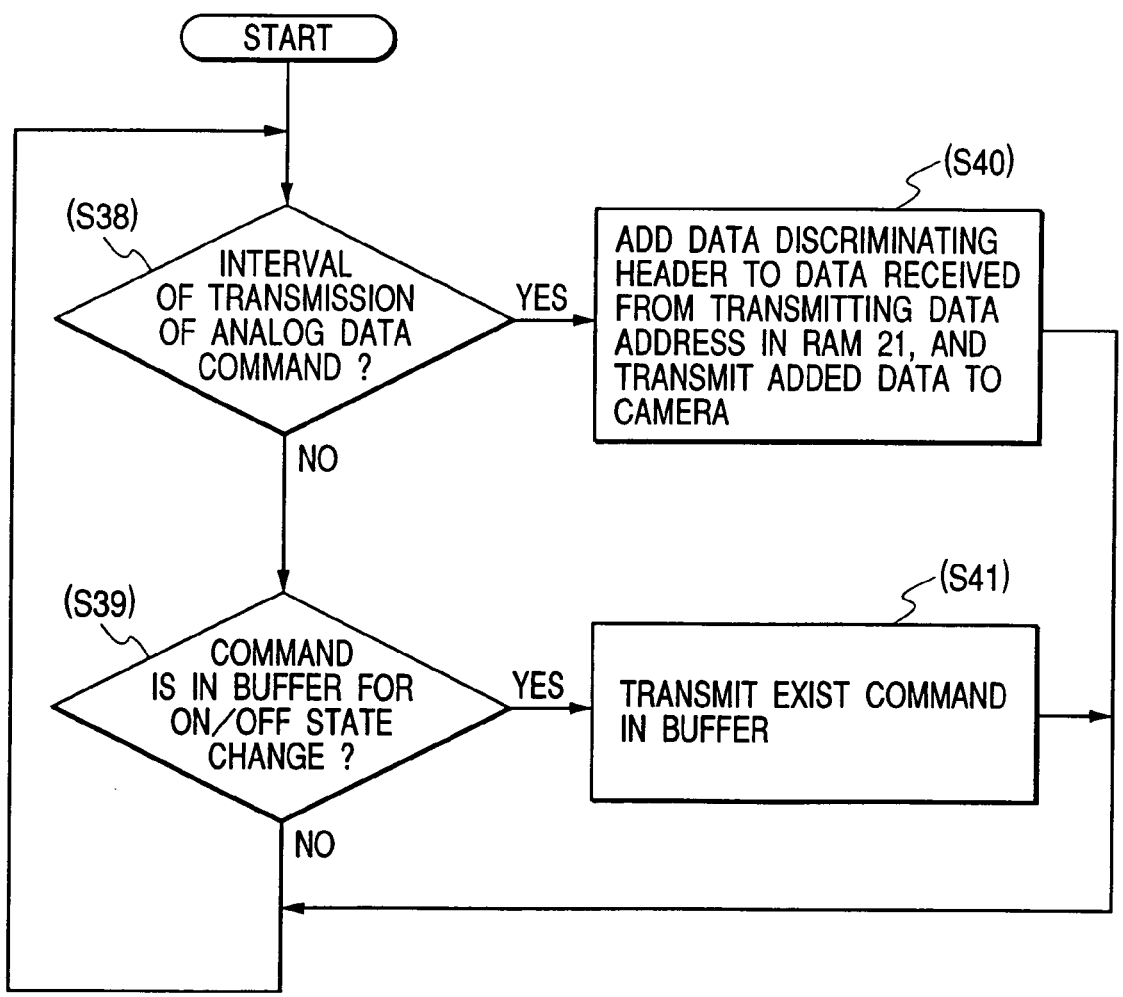
FIG. 17 is a flow chart showing a communication for transmitting to the camera.

FIG. 17 is a flow chart showing the sequence of communication to the camera. The transmission command to the camera include, as shown in FIG. 22B, an iris F-number follow command, a zoom focal length follow command, a focus object distance follow command, and a lens control on/off answer command. The iris F-number follow command, zoom focal length follow command and focus object distance follow command will be collectively called analog data commands. At the interval for transmitting the analog data command, data are received from the RAM 21 shown in FIG. 24B and are transmitted, together with a header for data identification, to the camera (S40). When there is no interval, the lens control on/off answer command is transmitted if it is present in the transmission buffer (S41).

As explained in the foregoing, the mount incorporating the camera interface board of the configuration shown in FIG. 12 allows to convert the data transmitted from the camera by serial communication into the normalized data of the format in the lens.

What is claimed is:

1. A lens device comprising:
a camera interface board that conforms a lens control signal to a predetermined data format of said lens device; and
a lens circuit board, wherein said lens circuit board controls said lens device, and wherein said lens circuit board is connected with said camera interface board through a serial communication line,
wherein said lens device is attachable to a camera employing a first data format for said lens control signal,
wherein said lens device is attachable to a camera employing a second data format for said lens control signal,
wherein said first format and said second format differ by at least one of position voltage, reference voltage, voltage width, and polarity,
wherein said lens device is attached to one of the cameras, and said lens control signal is received from the attached camera,
wherein the first data format and the second data format use analog signals, and
wherein the camera interface board is detachably attached to the lens circuit board.

2. A lens device according to claim 1, further comprising a camera code switch for switching an interface in said camera interface board in accordance with attached camera kind.

3. A lens device, comprising:
a lens control circuit board; and
a camera interface board disposed in digital communication with the lens control circuit board via a single serial digital link, wherein the camera interface board is disposed in analog communication with a camera via an analog link, and wherein the camera interface board is detachably attached to the lens control circuit board,
wherein the camera interface board performs:
receiving, via the analog link, an analog lens control signal from the camera;
converting, in accordance with a camera manufacturer code signal, the lens control signal into a signal understandable by the lens control circuit board; and
providing, to the lens control circuit board via the single serial digital link, the signal understandable by the lens control circuit board.

4. A lens device according to claim 3, wherein said lens control signal is one of an iris control signal, a zoom control signal, and a focus control signal.

5. A television camera system comprising a lens device according to claim 3 and a camera connected to said lens device.

* * * * *